INVENTOR
HENRY C. VON STRUVE III

ATTORNEYS

United States Patent Office 3,545,268
Patented Dec. 8, 1970

3,545,268
GROUND TRACK ALIGNMENT SENSING SYSTEM
Henry C. Von Struve III, Littleton, Colo., assignor to Martin-Marietta Corporation, New York, N.Y., a corporation of Maryland
Filed May 5, 1966, Ser. No. 547,916
Int. Cl. G01c 21/00
U.S. Cl. 73—178
9 Claims

ABSTRACT OF THE DISCLOSURE

An artificial satellite or space vehicle alignment sensor system is disclosed which employs four sensors having divergent axes that intersect the surface of an orbited body at two forward and two rearward points. When each rearward point is directly behind an associated forward point, the heading deviation is zero. The amount of deviation is determined by correlating the outputs of a rearward sensor and its associated forward sensor. The direction of the deviation is determined by correlating the outputs of each rearward sensor and its diametrically opposed forward sensor and comparing the magnitude of the resulting correlations.

---

This invention relates in general to an alignment sensor, and more particularly to a novel sensing system adapted to be used with an artificial satellite or space vehicle for determining the magnitude and polarity of yaw or heading errors with respect to a projected ground track on the surface of a celestial body being orbited.

The majority of the prior art directional sensing systems designed for use in a space flight control environment are gyroscopic in nature. These systems are extremely complex from both an electrical and mechanical standpoint, are costly in that the mechanical components must be machined to very close tolerances, and are relatively heavy in situations where weight limitations are of prime importance.

It is therefore a primary object of this invention to provide a method and apparatus for sensing ground track alignment which overcomes the above-noted disadvantages of the prior art devices and which is particularly intended to be used in an orbiting satellite to detect yaw or heading errors.

It is a further object of this invention to provide such a method and apparatus which employs correlation techniques between signals representing sensed surface characteristics to derive both the magnitude and polarity of heading errors.

It is a further object of this invention to provide such a method and apparatus in which any variable surface characteristic or signature of the orbited celestial body may be sensed, such as its infra-red signature, its geophysical profile, its optical signature, etc., and in which the sensing means may be either active or passive in nature.

Figure 1:
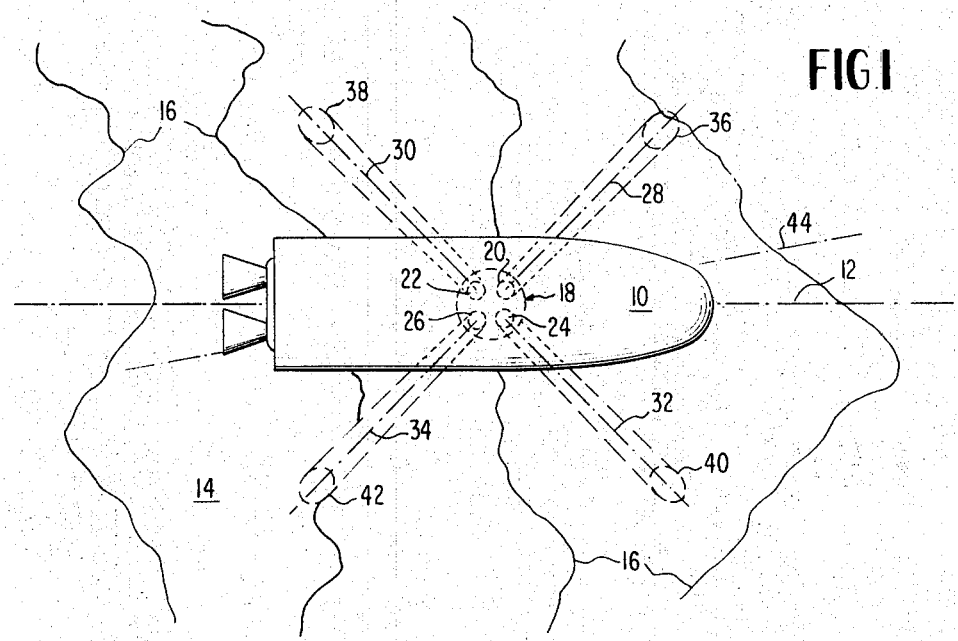
Figure 2:
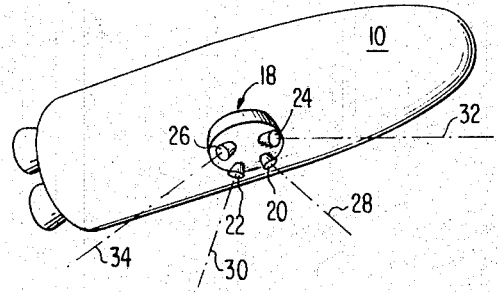
Figure 3:
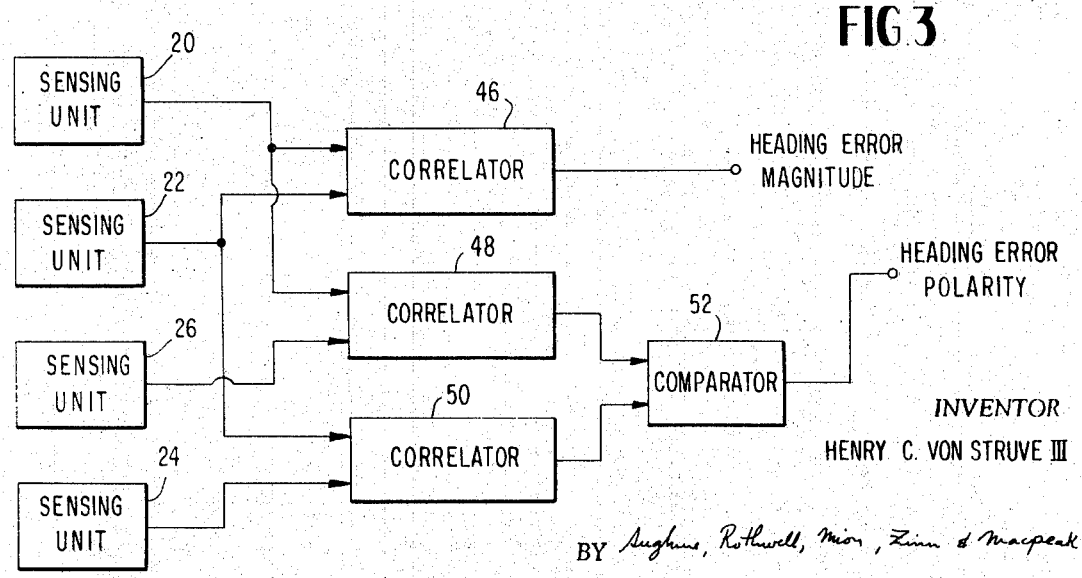

The foregoing and other objects, features and advantages of the invention will be apparent from the following more particular description of a preferred embodiment of the invention, as illustrated in the accompanying drawings in which:

FIG. 1 shows the top view of an artificial satellite orbiting a celestial body including the sensor fields and signature lines, FIG. 2 shows the bottom of the satellite and illustrates a typical sensor unit configuration and FIG. 3 shows a block diagram of an electronic system for processing the sensed signals.

Briefly, according to the invention a satellite is provided with four sensing devices having divergent axes that all project toward the surface of the body being orbited. The spatial configuration of the axes may be envisioned by likening them to the four legs of a rectangular based pyramid, with the axis of the properly aligned satellite being parallel to either the longitudinal or the transverse sides of the rectangle. Assuming that the satellite is stabilized in pitch, the viewing fields of the sensor pairs on either side of the satellite will pass over identical areas on the surface of the orbited body, one behind the other, if there is no yaw or heading error. Given this optimum condition, correlation techniques may therefore be applied to the sensor outputs to determine both the magnitude and polarity of any heading error which may exist with respect to the surface projected ground track.

Referring to FIGS. 1 and 2, a satellite or space vehicle 10 projects or traces a ground track 12 on the surface of a body 14 having signature contour lines 16. The particular ground characteristic represented by the signature lines may be any detectable parameter, as pointed out above. The satellite is provided with a rigidly mounted sensor assembly 18, shown in exaggerated form for clarity, which includes four individual sensing units 20, 22, 24 and 26. These units may be of any specific type and construction well known in the art, and may either actively or passively sense any suitable surface characteristic. The sensing unit axes 28, 30, 32 and 34 fan out from the assembly 18 in the manner shown to form the legs of a rectangular pyramid. The angle between axes 28 and 30 is thus equal to the angle between axes 32 and 34, and in a similar manner the angle between axes 28 and 32 is equal to the angle between axes 30 and 34. Assuming that the sensing unit envelopes are symmetrical about their axes, the projected surface viewing areas 36, 38, 40 and 42 will be slightly elliptical in nature.

If the satellite 10 is properly oriented with respect to its ground track 12, i.e. its axis is parallel to the ground track tangent, viewing area 38 will follow directly behind viewing area 36 at a distance that is a function of the orbital height and the angle between the axes. Under these conditions, the output from sensing unit 20, if delayed by the time it takes for the satellite to travel the distance between viewing areas 36 and 38, will exactly match the output from sensing unit 22. By similar reasoning, the outputs from sensing units 24 and 26 will also be matched when the leading one is delayed the proper length of time.

On the other hand, if a heading error exists i.e. the axis of the satellite 10 is skewed with respect to its ground track, areas 36 and 38 are displaced normal to the ground track by unequal distances and their surface traces are parallel rather than coincident. Under these circumstances the delayed output of sensing unit 20 is not equal to the output of sensing unit 22, and the two outputs exhibit a degree of mismatch which, over a narrow range of heading errors, is substantially proportional to the heading deviation.

Furthermore, assuming that a heading error to the left exists, as indicated by line 44, since the sensor assembly 18 and the associated surface viewing areas will also be rotated counter-clockwise, the sum of the displacements of areas 36 and 42 normal to the ground track will be greater than the sum of the displacements of areas 38 and 40. This is readily visualized by noting that as the satellite 10 is rotated counterclockwise from the position shown in FIG. 1, areas 36 and 42 move farther away from the ground track 12 while areas 38 and 40 move closer to it. Since the surface traces of areas 36 and 42 are thus farther apart than those of areas 38 and 40, the degree of mismatch between the delayed output of sensing unit 20 and that of sensing unit 26 will be greater than the mismatch between the delayed output of sensing unit 24 and that of sensing unit 22. This fact may be employed in the manner described below to determine the polarity or direction of the heading error.

FIG. 3 shows a system block diagram for implementing the correlation principles developed above. The sensing units are represented by the blocks on the left side of the figure. The outputs from sensing units 20 and 22 are fed to correlator 46 to determine the magnitude of the heading error. The correlators employed may be any one of a number of types well known in the art. Their specific constructions will not be described herein since they form no part of the invention. Correlator 46 functions in the manner described above to delay the output of sensing unit 20 by the time required for the satellite 10 to travel the distance between the viewing areas 36 and 38, and determine the degree of mismatch between the delayed output and that of sensing unit 22. As stated earlier, this mismatch is nearly proportional to the heading error over a narrow range of deviations.

The outputs from sensing units 20 and 26 are fed to correlator 48 and those from sensing units 22 and 24 are fed to correlator 50. The relative magnitudes of the mismatch signals developed by correlators 48 and 50 are then determined by comparator 52 to derive the polarity of an existing heading error. If the output of correlator 48 is greater than that of correlator 50, for example, the heading error would be to the left or in the counter-clockwise direction, and vice-versa.

It will be appreciated that the correlation techniques developed above will function as described even in the presence of a small roll error, in which case the pyramid defined by the sensing unit axes would have an isosceles trapezoid rather than a rectangular base. The magnitude of the roll error that can be tolerated is determined by the orbital height, the divergence of the sensing unit axes and the size of the orbited body, but in any event must be such that all four of the axes intersect the surface of the body.

The magnitude and polarity of the heading error thus determined may be usefully employed in any number of ways. As one example, the signals may be used to actuate transversely oriented Newtonian reactors, such as compressed air exhaust nozzles, to effect realignment.

As an alternative, the sensor assembly 18 may be gimballed rather than rigidly mounted to the satellite. In such a case the heading error magnitude and polarity signals could be used in servo loop fashion to drive the gimbals and maintain the sensor assembly in correct alignment with respect to the surface ground track. The satellite alignment error would then be taken directly from the gimbal angles, and once again, could be used to effect satellite repositioning.

While the invention has been particularly shown and described with reference to a preferred embodiment thereof, it will be understood that various changes in form and detail may be made therein by those skilled in the art without departing from the spirit and scope of the invention.

What is claimed is:

1. A method for sensing heading deviations of an orbiting satellite with respect to a projected ground track on the surface of a celestial body, comprising the steps of:
    (a) sensing a varying surface characteristic of the body from the satellite along a first line parallel to the projected ground track,
    (b) sensing said characteristic of the body from the satellite along a second line parallel to the projected ground track, and
    (c) correlating the surface characteristic as sensed along the first and second lines to determine the heading deviation.

2. A method for sensing heading deviations as defined in claim 1 wherein the sensing steps recited in sub-paragraphs (a) and (b) are performed on divergent axes that intersect the surface of the celestial body at forward and rear points that are directly behind one another when the heading deviation is zero.

3. A method for sensing heading deviations as defined in claim 2 wherein the correlation step recited in sub-paragraph (c) includes the step of delaying a signal representing the characteristic sensed at the forward point by the time required for the satellite to travel the distance between the forward and rear points on the surface of the celestial body, whereby an exact correlation between the sensed characteristics represents zero heading deviation.

4. A method for sensing heading deviations as defined in claim 1 further comprising:
    (a) sensing said characteristic of the body from the satellite along third and fourth lines parallel to the projected ground track,
    (b) the sensing steps along the first, second, third and fourth lines being performed on four divergent axes that form the sides of a pyramid,
    (c) separately correlating the characteristic as sensed on diagonally opposite ones of the divergent axes, and
    (d) comparing the results of the separate correlations to determine the polarity of the heading deviation.

5. A method for sensing heading deviations as defined in claim 4 wherein:
    (a) the four divergent axes intersect the surface of the orbited body at two forward and two rear points such that each rear point is directly behind an associated forward point when the heading deviation is zero, and
    (b) the correlations steps recited in sub-paragraphs (c) of claims 1 and 4 include the step of delaying a signal representing the characteristic sensed at a forward point by the time required for the satellite to travel the distance between a forward and a rear point on the surface of the orbited body, whereby an exact correlation as recited in sub-paragraph (c) of claim 1 and an exact comparison as recited in sub-paragraph (d) of claim 4 represents zero heading deviation.

6. An apparatus for sensing heading deviations of an orbiting satellite with respect to a projected ground track on the surface of a celestial body, comprising:
    (a) first sensing means mounted to the satellite for detecting a varying surface characteristic of the body along a first line parallel to the projected ground track and producing an electrical output signal proportional thereto,
    (b) second sensing means mounted to the satellite for detecting the characteristic of the body along a second line parallel to the projected ground track and producing an electrical output signal proportional thereto, the first and second sensing means having two divergent axes that intersect the surface of the body at forward and rear points that are directly behind one another when the plane including the axes is parallel to the ground track, and
    (c) correlating means responsive to the electrical output signals from the first and second sensing means for determining the degree of mismatch between the signals as an indication of the heading deviation.

7. An apparatus for sensing heading deviations as defined in claim 6 wherein the correlating means includes means for delaying a signal representing the characteristic sensed at the forward point by the time required for the satellite to travel the distance between the forward and rear points on the surface of the orbited body, whereby an exact correlation between the sensed characteristics represents zero heading deviation.

8. An apparatus for sensing heading deviations as defined in claim 6 further comprising:
    (a) third sensing means mounted to the satellite for detecting the characteristic of the body along a third line parallel to the projected ground track and producing an electrical output signal proportional thereto, (b) fourth sensing means mounted to the satellite for detecting the characteristic of the body along a fourth line parallel to the projected ground track and producing an electrical output signal proportional thereto, the first, second, third and fourth sensing means having four divergent axes that form the sides of a pyramid, (c) means for separately correlating the output signals from the sensing means on diagonally opposite ones of the divergent axes, and (d) means for comparing the outputs from the separate correlating means to determine the polarity of the heading error.

9. An apparatus for sensing heading deviations as defined in claim 8 wherein:

(a) the four divergent axes intersect the surface of the orbited body at two forward and two rear points such that each rear point is directly behind an associated forward point when the heading deviation is zero, and (b) the correlating means recited in sub-paragraphs (c) of claims 6 and 8 each include means for delaying a signal representing the characteristic sensed at a forward point by the time required for the satellite to travel the distance between a forward and a rear point on the surface of the orbited body, whereby an exact correlation by the means recited in sub-paragraph (c) of claim 6 and an exact comparison by the means recited in sub-paragraph (d) of claim 8 represents zero heading deviation.

References Cited

UNITED STATES PATENTS

| | | | |
|---|---|---|---|
| 2,643,457 | 6/1953 | Skalka | 33—46.5 |
| 2,942,119 | 6/1960 | King et al. | 33—46.5X |
| 2,995,662 | 8/1961 | Hamilton | 33—46.5X |

DONALD O. WOODIEL, Primary Examiner